United States Patent
Liu et al.

(10) Patent No.: US 10,440,692 B2
(45) Date of Patent: Oct. 8, 2019

(54) REPORTING IDLE MODE EQUIPMENT DATA

(71) Applicant: Nokia Technologies Oy, Espoo (FI)

(72) Inventors: Yang Liu, Beijing (CN); Dajiang Zhang, Beijing (CN)

(73) Assignee: Nokia Technologies Oy, Espoo (FI)

(*) Notice: Subject to any disclaimer, the term of this patent is extended or adjusted under 35 U.S.C. 154(b) by 28 days.

(21) Appl. No.: 14/896,718

(22) PCT Filed: Jun. 13, 2013

(86) PCT No.: PCT/CN2013/077178
§ 371 (c)(1),
(2) Date: Dec. 8, 2015

(87) PCT Pub. No.: WO2014/198041
PCT Pub. Date: Dec. 18, 2014

(65) Prior Publication Data
US 2016/0150523 A1    May 26, 2016

(51) Int. Cl.
*H04W 4/00*    (2018.01)
*H04W 72/04*    (2009.01)
*H04W 24/10*    (2009.01)

(52) U.S. Cl.
CPC ....... *H04W 72/0413* (2013.01); *H04W 24/10* (2013.01)

(58) Field of Classification Search
CPC ...... H04W 72/04; H04W 88/08; H04W 76/00
See application file for complete search history.

(56) References Cited

U.S. PATENT DOCUMENTS

2010/0261469 A1* 10/2010 Ribeiro ............... H04W 99/00
455/423
2011/0075583 A1    3/2011 Imai et al.
(Continued)

FOREIGN PATENT DOCUMENTS

CN    102422703 A    4/2012
CN    103002578    3/2013
(Continued)

OTHER PUBLICATIONS

U.S. Appl. No. 61/765,019 Provisional Specification.*
(Continued)

*Primary Examiner* — Siren Wei
(74) *Attorney, Agent, or Firm* — Seppo Laine Oy (57) ABSTRACT

In accordance with an example embodiment of the present invention, there is provided an apparatus such as for example a mobile or a base station, comprising at least one processing core configured to compile a message comprising information concerning resources used in a communication network, the at least one processing core being configured to perform a first determination, that a second user equipment is engaged in a device-to-device session with a first user equipment, the at least one processing core being configured to, responsive to the first determination, include in the message information concerning the second user equipment, and a transmitter configured to cause the message to be transmitted toward a network node. The message may comprise a resource usage report and/or charging report, for example.

18 Claims, 5 Drawing Sheets

(56) References Cited

U.S. PATENT DOCUMENTS

| | | | | |
|---|---|---|---|---|
| 2012/0020213 | A1* | 1/2012 | Horneman | H04W 76/14 370/231 |
| 2013/0051277 | A1* | 2/2013 | Hakola | H04W 76/14 370/254 |
| 2013/0088962 | A1 | 4/2013 | Stjernholm et al. | |
| 2013/0324114 | A1* | 12/2013 | Raghothaman | H04W 8/005 455/426.1 |
| 2014/0256334 | A1* | 9/2014 | Kazmi | H04W 28/18 455/450 |
| 2014/0329494 | A1* | 11/2014 | Zisimopoulos | H04M 15/66 455/406 |
| 2015/0341150 | A1* | 11/2015 | Seo | H04B 7/2656 370/336 |

FOREIGN PATENT DOCUMENTS

| | | | |
|---|---|---|---|
| CN | 103152748 | | 6/2013 |
| EP | 2992642 B1 | | 2/2017 |
| WO | 2010/057524 A1 | | 5/2010 |
| WO | 2010102668 | | 9/2010 |
| WO | WO 2011098128 A1 * | 8/2011 | H04W 4/08 |
| WO | WO-2011098128 A1 * | 8/2011 | H04W 4/08 |
| WO | 2013/012241 A2 | | 1/2013 |

OTHER PUBLICATIONS

Sheu et al., "Load Analysis for MTC Devices in Idle Mode or Detached State", International Computer Symposium, Dec. 16-18, 2010, pp. 424-428.

Cheng et al., "Resource Allocation for Cognitive Networks with D2D Communication: An Evolutionary Approach", Wireless Communications and Networking Conference, Apr. 1-4, 2012, pp. 2671-2676.

Extended European Search Report received for corresponding European Patent Application No. 13886973.0, dated Jan. 4, 2017, 7 pages.

"3rd Generation Partnership Project; Technical Specification Group Services and System Aspects; Study on architecture enhancements to support Proximity Services (ProSe) (Release 12)", 3GPP TR 23.703, V0.4.1, Jun. 2013, pp. 1-85.

International Search Report and Written Opinion received for corresponding Patent Cooperation Treaty Application No. PCT/CN2013/077178 , dated Mar. 13, 2014, 10 pages.

* cited by examiner

REPORTING IDLE MODE EQUIPMENT DATA

RELATED APPLICATION

This application was originally filed as a PCT Application No. PCT/CN2013/077178 filed Jun. 13, 2013.

TECHNICAL FIELD

The present application relates generally to reporting data on idle devices, for example in cellular communication systems.

BACKGROUND

Wireless communication, such as radio communication, may be arranged to occur between mobile units, such as cellular telephones, wireless-enabled laptops or wireless sensors or other radio-enabled mobile devices, and base stations. A telephone call, for example, may be placed from a smartphone, from where it may be routed via an air interface to a base station. From the base station, the call may be routed through a cellular core network to a call recipient. Alternatively, a smartphone may be arranged to access the Internet, for example, via the air interface to the base station, and from the base station directly to a data communication network whereby a core network is in this case not needed to access the Internet.

Mobile radio-enabled devices, such as suitably enabled cellular telephones, may be capable of communicating with each other directly or locally. Such communication may be known as device-to-device, or D2D, communication. Direct D2D communication may comprise that a first mobile transmits information encoded in a radio signal, and a second mobile receives the radio signal, wherein the radio signal isn't re-transmitted along the way. In other words, radio energy encoded with information transmitted from the first mobile is received in the second mobile. Local D2D communication may comprise that involved mobiles exchange information via a base station, wherein the base station doesn't forward the information to a core network node or a radio-access network controller node.

D2D communication may be useful, for example, when coverage of a mobile communication network is insufficient. As a yet further option, D2D communication may be used to offload communication between two nearby mobiles to D2D mode, so that resources of the mobile communication network may be used to serve more users and mobile device power consumption can be reduced.

Mobiles may be enabled to have more than one radio carrier active at a given time. For example, a mobile may receive data via a wireless local area network, WLAN, radio network while being engaged in a video call over a wideband code division multiple access, WCDMA, network. Likewise some mobiles may simultaneously have active a D2D connection with another mobile, and at least one connection to a wireless network, such as WLAN, WCDMA or long term evolution, LTE.

SUMMARY

Various aspects of examples of the invention are set out in the claims.

According to a first aspect of the present invention, there is provided an apparatus, comprising at least one processing core configured to compile a message comprising information concerning resources used in a communication network, the at least one processing core being configured to perform a first determination, that a second user equipment is engaged in a device-to-device session with a first user equipment, the at least one processing core being configured to, responsive to the first determination, include in the message information concerning the second user equipment, and a transmitter configured to cause the message to be transmitted toward a network node.

According to a second aspect of the present invention, there is provided a method, comprising compiling a message comprising information concerning resources used in a communication network, performing a first determination, that a second user equipment is engaged in a device-to-device session with a first user equipment, including, responsive to the first determination, in the message information concerning the second user equipment, and causing the message to be transmitted toward a network node According to a third aspect of the present invention, there is provided a computer program product comprising a computer-readable medium bearing computer program code embodied therein for use with a computer, the computer program code comprising code for compiling a message comprising information concerning resources used in a communication network code for performing a first determination, that a second user equipment is engaged in a device-to-device session with a first user equipment code for including, responsive to the first determination, in the message information concerning the second user equipment, and code for causing the message to be transmitted toward a network node.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

In D2D sessions, when one of the involved UEs remains in a connected state to facilitate network control of the D2D session, it may be possible to leave another involved UE in an idle mode for power saving purposes. If, however, based on network charging policies all charging procedures are performed with UEs is in a connected mode, the idle-mode UE would not be a subject of charging procedures. Since UEs involved in D2D sessions, even if in idle mode, may consume the network resources, it could be reasonable for operators to charge D2D UEs even when in an idle mode.

Figure 1:
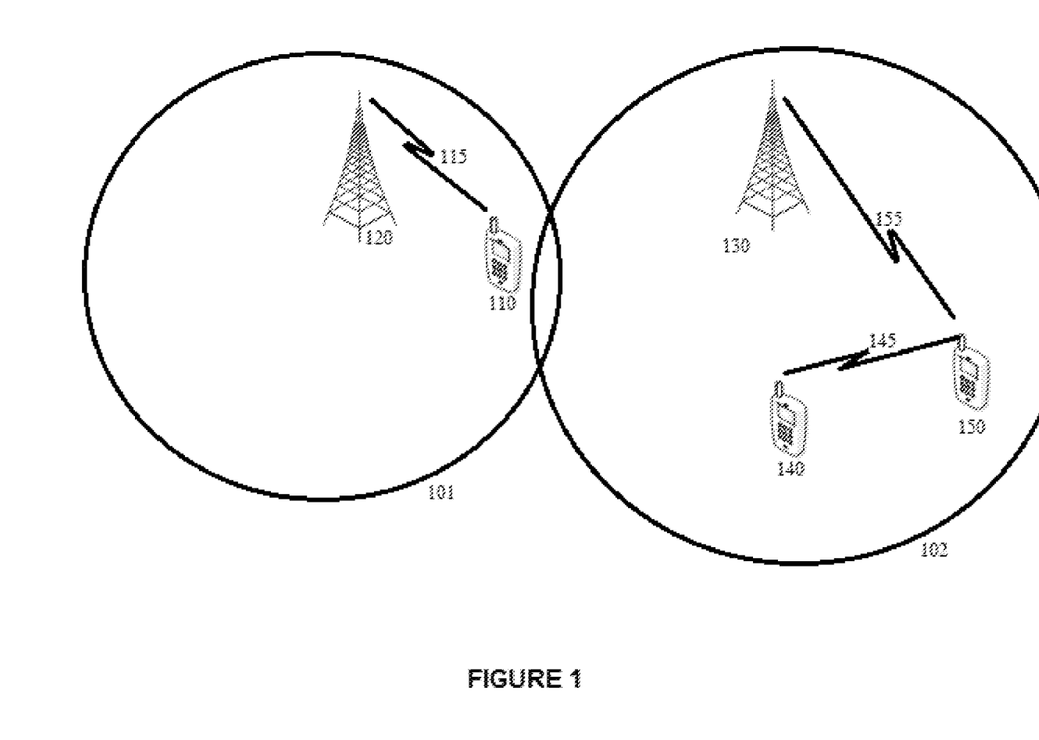
FIG. 1 illustrates an example system capable of supporting at least some embodiments of the invention.

FIG. 1 illustrates an example system capable of supporting at least some embodiments of the invention. Illustrated is mobile 110, which may comprise, for example, a user equipment, cellular telephone, laptop computer, tablet computer, personal digital assistant, PDA, wireless sensor or other mobile device with connectivity functions. An example of structure of mobile 110 is presented in FIG. 2. Mobile 110 is illustrated as being disposed in the cell coverage area of cell 101. Cell 101 is controlled by base station 120, which may be configured to operate in accordance with a radio access technology. Examples of radio access technologies include WLAN, WCDMA, IS-95 and LTE. Mobile 110 is illustrated as being in radio communication with base station 120 via wireless link 115. When base station 120 operates according to a certain radio access technology, RAT, wireless link 115 operates according to the same RAT. Wireless link 115 may comprise an uplink for conveying information from mobile 110 to base station 120. Wireless link 115 may comprise a downlink for conveying information from base station 120 to mobile 110. Mobile 110 is in the example of FIG. 1 attached to a cell of base station 120, namely cell 101. Being attached to a cell may comprise that mobile 110 has a state, such as connected, active or idle, with respect to the cell. Being attached may comprise having an active bearer with the cell. Being attached to a cell may comprise that the cell is the cell mobile 110 will signal to in case mobile 110 needs connectivity.

Mobile 110 may access services of a cellular communications network via wireless link 115 and base station 120. For example, base station 120 may be operably connected to further nodes, which are not illustrated in FIG. 1. Such further nodes may comprise, for example, radio access network controllers or core network nodes, such as switches or gateways. Mobile 110 may request, and receive, content from the Internet via such further nodes, base station 120, and wireless link 115. A user of mobile 110 may be charged for services obtained via mobile 110 and the network.

Illustrated in FIG. 1 are also mobiles 140 and 150. Mobile 140 and mobile 150 are illustrated as being interconnected by D2D wireless link 145. D2D wireless link 145 may operate in accordance with a cellular RAT, or another RAT suitable for such use. D2D wireless link 145 may operate on a different frequency band than cellular cell 101 and/or cell 102, such as for example an unlicensed band or a dedicated D2D band. Alternatively, D2D wireless link 145 may operate on a same frequency band as cellular cells such as cell 101 and/or cell 102. Mobile 150 is illustrated as being in radio communication with base station 130 via wireless link 155. Wireless link 155 may be essentially similar to wireless link 115. Base station 130 controls cell 102, which is adjacent to cell 101. Cell coverage areas of cell 101 and cell 102 overlap to a degree to allow for seamless service provision to mobiles roaming in the area. Should a mobile cross over from the cell coverage area of cell 101 to that of cell 102, a handover procedure may be triggered to cause attachment of the mobile to change from cell 101 to cell 102. In FIG. 1, mobile 110 is near the overlap area of cell coverage areas of cell 101 and cell 102.

In the illustrated system, mobile 140 may be in an idle mode. Being in an idle mode may comprise that no connection is available or active to the cellular network. Being in an idle mode may comprise that no connection is active from the mobile to a base station. Mobile 140 may be set to an idle mode to conserve battery, for example. Mobile 150 may be a point of contact for mobile 140, in other words should a communication arrive for mobile 140, base station 130 may inform mobile 150 of the communication, responsive to which mobile 150 may inform mobile 140 to enable mobile 140 to transition to an active mode for receiving the communication. In some embodiments, the communication may be delivered to mobile 140 via mobile 150 and D2D wireless link 145.

A cellular communication network may be configured to manage radio resources used in cells of the network. To enable such control, and to enable charging for use of the system, the cellular communication network may use messages, such as reports, such as radio resource usage reports and/or charging reports. Such messages may comprise information on resources used in communications in the cellular communication network. The resources may be used in accessing the system as mobile 110 does via wireless link 115, as mobile 140 does via mobile 150 and base station 130 or as mobiles 140 and 150 do when communicating directly with each other. In the last example, direct D2D communication consumes network resources since it may create interference in cells comprised in the system, which decreases the overall capacity of the system. A mobile may be in an idle mode with respect to the cellular communication network, while being in active communication with another mobile within a D2D session. Another way in which direct D2D communication consumes system resources is that information on mobiles participating in direct D2D communication need to be maintained in registers of the system.

Messages such as radio resource usage reports and/or charging reports may be generated by mobiles, by base stations or by server nodes or functions that authorize use of network resources by mobiles. An example of such a server is a DSRF, or D2D registration server function. A DSRF may be co-located in a base station site, as a standalone node or in a core network.

If the network determines, based on radio resource usage reports, that a certain mobile consumes a lot of network resources, it may instruct this mobile to reduce its consumption of resources to allow other mobiles more reliable access to the system. In this sense, radio resource usage reports may be used to enable managing overall system dependability as a variance in resource usage between mobiles is controlled.

Charging reports may be used by the network to generate invoices to subscribers for using resources of the network. Invoicing associates a cost with resource usage, which may also result in a reduced number of mobiles that use a very high amount of resources. This may also result in improved network dependability as cells may become more evenly and predictably loaded.

When mobiles 140 and 150 are engaged in a D2D session with each other, both mobiles may be seen as consuming network resources as described above. In this regard, the network may desire to associate resource usage to both mobiles, for at least one of resource use control and charging purposes. In case the network is arranged to collect radio resource usage reports and/or charging reports solely from mobiles in an active, or connected, mode, mobile 140 may have to be caused to transition to an active or connected mode in order to transmit a report. Since mobile 140 may have been set to an idle mode to conserve energy, causing its transition out of the idle mode would be counterproductive, and further, signaling associated with such a transition would in itself consume network resources.

Mobile 150, being in an active or connected mode, on the other hand is enabled to send radio resource usage reports and/or charging reports. Mobile 150 also knows if it is in a D2D session with mobile 140, mobile 140 being in an idle mode, wherefore mobile 150 may be configured to report resource usage on behalf of mobile 140. To this end, mobile 150 may include in a report sent from mobile 150 information relating to mobile 140. The information included relating to mobile 140 may comprise, for example, an identity of mobile 140, resources used by mobile 140, a share of D2D resources used by mobile 140 and a network or network entity that collects resource usage information concerning mobile 140. Alternatively, mobile 150 may send separate reports concerning itself and mobile 140.

Alternatively to a mobile, a base station may be configured to compile or amend reports on resource usage, the reports comprising or to comprise information on resource usage by a mobile in an idle mode. For example, if two mobiles are engaged in a local D2D session, the base station interconnecting the mobiles may be in a good position to compile messages comprising resource use information of mobiles involved in the D2D session, even if at least one of the mobiles is in an idle mode. In some embodiments, where a base station is involved in a local D2D session between two mobiles, one of the mobiles being in an idle mode and the other in an active mode, the base station may be configured to include in reports it receives from the mobile in an active mode information concerning the mobile in an idle mode before forwarding the report onward in the network.

The network may route reports to specific nodes, such as load balancing, subscriber management and/or charging entities, for example. In case a report comprises information on more than one mobile, and one of the mobiles is a subscriber of another network, the network may split the report and transmit the part relating to the subscriber of the other network to the network concerned. A subscriber of another network may be referred to as a roaming subscriber. In some cases, the report may comprise an identity of a network or a node to which resource use information concerning a roaming subscriber is to be sent. This is useful in case a report comprises information of resource use by a roaming subscriber, since the network is thereby enabled to report the information to an appropriate node by inspecting the contents of the report.

A mobile participating in a D2D session may receive from another mobile participating in the D2D session a message comprising an identity or address of the network or node to which resource use information concerning the another mobile is to be sent. Thereafter the mobile that received the message may include the identity or address in a charging report or resource usage report it sends that comprises information concerning the another mobile, even in case the another mobile has transitioned to an idle mode.

In general there is provided an apparatus, such as for example a mobile, a base station or a control device for inclusion in a mobile or base station, to control the functioning thereof. The apparatus comprises at least one processing core configured to compile a message comprising information concerning resources used in a communication network. The communication network may comprise a cellular radio communication network, for example. The information on resources used may comprise at least one of a bandwidth used, a time used, an amount of energy used, a registration used and an amount of data received or transmitted using resources of the network. Resources of the network may comprise a frequency range allocated to the network, for example. The at least one processing core may be configured to perform a first determination, that a second user equipment is engaged in a device-to-device session with a first user equipment. The device-to-device session may be a direct D2D session or a local D2D session. Responsive to the first determination, the at least one processing core may be configured to include in the message information concerning the second user equipment. The apparatus comprises a transmitter configured to cause the message to be transmitted toward a network node. The network node may comprise a base station in embodiments where the apparatus comprises a mobile. In embodiments where the apparatus comprises a base station, the network node may comprise a core network node or a radio network controller, for example. In embodiments where the apparatus comprises a control device for controlling a mobile or a base station, the transmitter may comprise an output port such as a serial port, for example, of the control device, wherein the output port may be configured to cause the message to be transmitted by signaling from the control device, via electrical leads internal to the mobile or a base station, to a transmitter of the mobile or base station. Examples of control devices include processors and chipsets, for example.

In some embodiments, the first determination further comprises a determination that the second user equipment is in an idle mode. In other words, in these embodiments the first determination comprises determining both that the second user equipment is engaged in a device-to-device session with the first user equipment and that the second user equipment is in an idle mode.

In some embodiments, the at least one processor is further configured to include in the message information concerning resources used by the first user equipment. Resources used by the first user equipment may be comprised in the information concerning resources used in the communication network, for example.

In some embodiments, the information concerning resources used by the first user equipment comprises information on radio resources used for the device-to-device session. For example, the message may comprise an indication the resources have been used in a device-to-device session. Alternatively the message may comprise information concerning resources used outside of any device-to-device session and information concerning resources used for a device-to-device session. In some embodiments, the message comprises, in addition to the information on the second user equipment, information concerning resources used by the first user equipment outside of any device-to-device session.

In some embodiments, the information concerning the second user equipment comprises an identity of a network that the second user equipment is associated with. For example, the identity of the network may be expressed as a public land mobile network identity, PLMN ID. Alternatively or on addition, the information concerning the second user equipment may comprise an identity or address of a node comprised in a home network of the second user equipment. Such a node may comprise, for example, a resource management node or a charging node.

In some embodiments, the at least one processing core is configured to compile the message at least one of responsive to an event and periodically. Examples of events that may trigger the compilation of the message include an end of the device-to-device session and a change in service quality of the device-to-device session. Examples of periodical transmission o the message include causing the message to be transmitted every minute and every 20 minutes.

Figure 3:
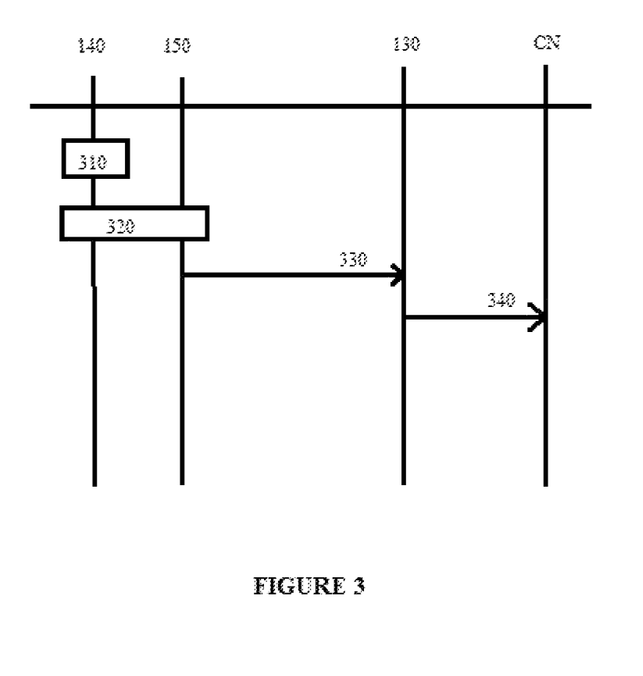
FIG. 3 illustrates signaling in accordance with at least some embodiments of the invention.

FIG. 3 illustrates signaling in accordance with at least some embodiments of the invention. On the vertical axes are, from left to right, in terms of FIG. 1, mobile 140, mobile 150, base station 130 and finally core network node CN, which is not illustrated in FIG. 1. Time advances from top to bottom. In phase 310, mobile 140 is in or is caused to transition to an idle mode. In phase 320, mobile 140 and mobile 150 are engaged in a direct D2D session with each other. In some embodiments, the chronological order of phases 310 and 320 may be reversed. In phase 330, mobile 150 may transmit a message, such as for example a radio resource usage report or charging report, to base station 130. The message of phase 330 may comprise information on mobile 140, such as for example at least one of a home network identity, subscriber identity, description of resources used by mobile 140 and a tunnel endpoint identity of mobile 140. The message of phase 330 may comprise information on radio resource usage in the D2D session between mobile 140 and mobile 150. The message of phase 330 may comprise information on radio resource usage separately for mobile 140 and mobile 150. The message of phase 330 may be sent in two parts, wherein the first part concerns mobile 140 and the second part concerns mobile 150. For example, the message of phase 330 may comprise information describing resources used by mobile 140 and a home network identity of mobile 140. In phase 340, base station 130 may forward the message of phase 330 to core network node CN.

Figure 4:
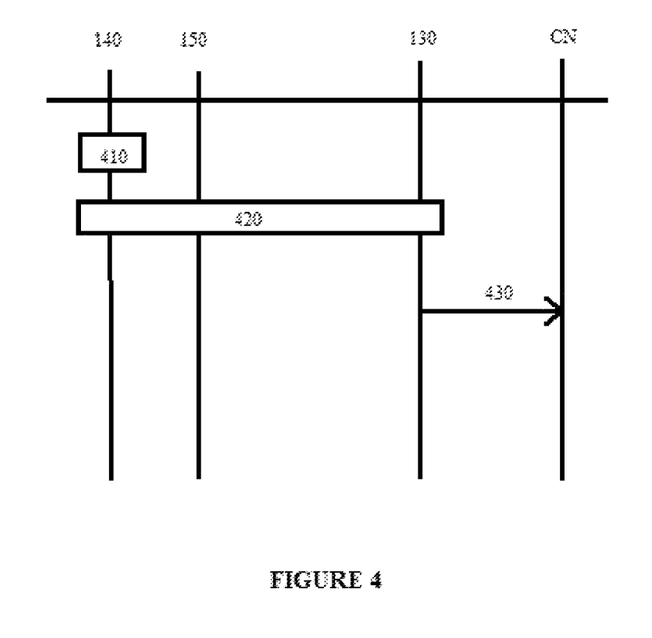
FIG. 4 illustrates signaling in accordance with at least some embodiments of the invention.

FIG. 4 illustrates signaling in accordance with at least some embodiments of the invention. FIG. 4 The vertical axes correspond to mobile 140, mobile 150, base station 130 and core network node CN as in FIG. 3. In phase 410, mobile 140 is in or is caused to transition to an idle mode, as in phase 310 of FIG. 3. In phase 420, mobile 140 and mobile 150 are engaged in a local D2D session with each other via base station 130. In some embodiments, the chronological order of phases 410 and 420 may be reversed. In phase 430, base station 130 may transmit a message, such as for example a radio resource usage report or charging report, to core network node CN. The contents of the message of phase 430 may be similar to the contents of the message of phase 330 of FIG. 3.

Figure 2:
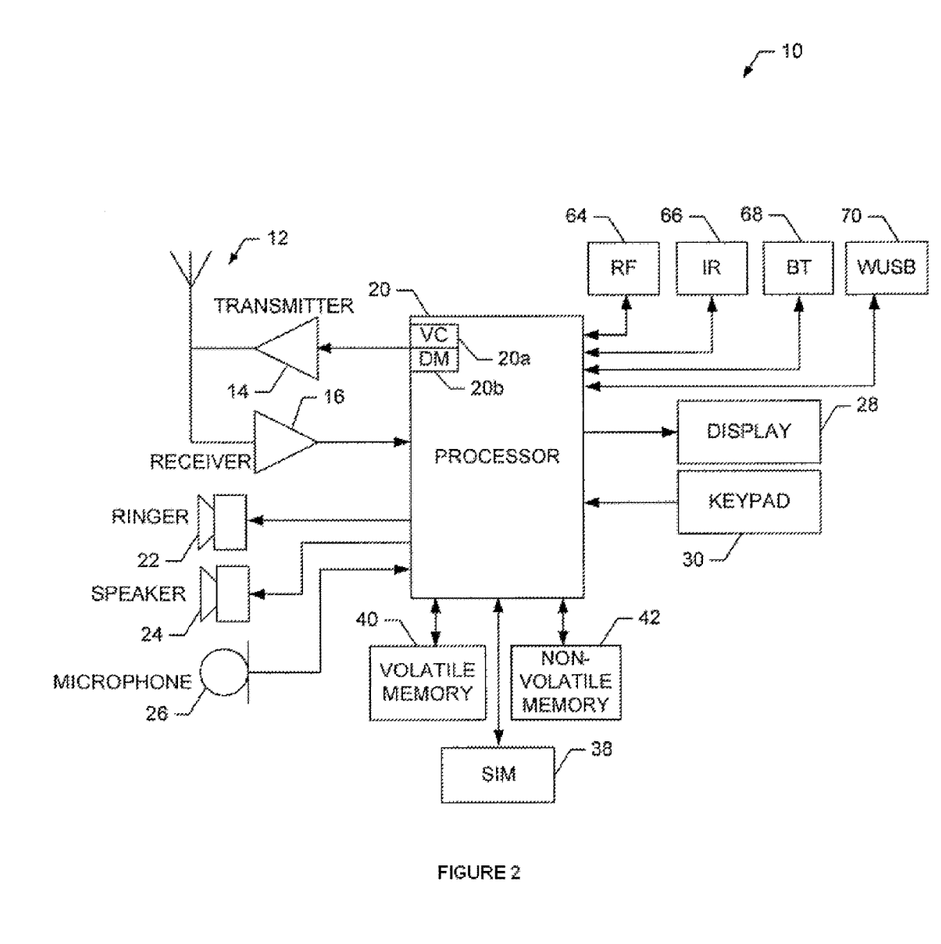
FIG. 2 illustrates a block diagram of an apparatus in accordance with an example embodiment of the invention.
Figure 5:
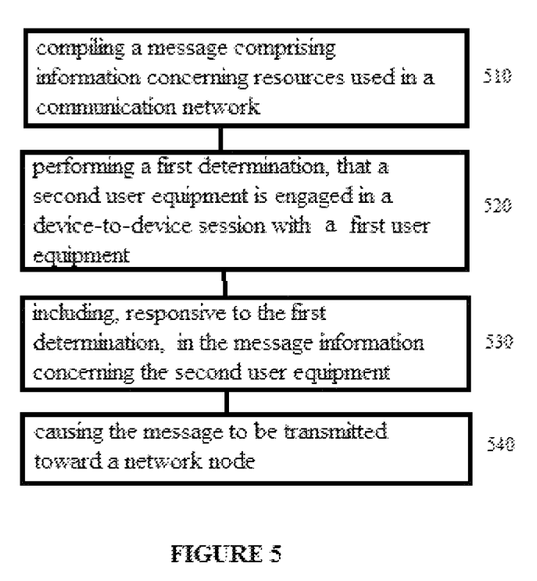
FIG. 5 is a flowgraph illustrating a method in accordance with at least some embodiments of the invention.

FIG. 5 is a flowgraph illustrating a method in accordance with at least some embodiments of the invention. The phases of the illustrated method may be performed in a mobile, for example. Alternatively, the phases may be performed in a base station, for example. Phase 510 comprises compiling a message comprising information concerning resources used in a communication network. Phase 520 comprises performing a first determination, that a second user equipment is engaged in a device-to-device session with the first user equipment. Phase 530 comprises including, responsive to the first determination, in the message information concerning the second user equipment. Finally, phase 540 comprises causing the message to be transmitted toward a network node FIG. 2 illustrates a block diagram of an apparatus 10 such as, for example, a mobile terminal, in accordance with an example embodiment of the invention. To appropriate extent, FIG. 2 also illustrates structure of a base station, as will be described further hereinbelow. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analogue or TDMA/CDMA/analogue phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analogue-to-digital converter, a digital-to-analogue converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Bluetooth low energy, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

While FIG. 2 is described above primarily in the context of a mobile device, certain of the components discussed, such as memories, processors and transceivers, can be employed to implement a network-side device such as a base station. Structural elements of a base station include elements similar to the ones described above. Elements of FIG. 2 that may be absent in a base station include ringer 22, speaker 24, microphone 26, display 28, keypad 30, SIM 38, IR 66, BT 68 and/or WUSB 70.

Without in any way limiting the scope, interpretation, or application of the claims appearing below, a technical effect of one or more of the example embodiments disclosed herein is that resource usage reporting in a network is facilitated. Another technical effect of one or more of the example embodiments disclosed herein is that managing network resources becomes more efficient. Another technical effect of one or more of the example embodiments disclosed herein is that energy is saves by enabling mobiles to remain in an idle mode.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    at least one processing core configured to compile a radio resource usage report comprising information concerning radio resources that have been used in a device-to-device session in a communication network;
    the at least one processing core being configured to perform a first determination, that a second user equipment which is in an idle mode with respect to a cellular communication network is engaged in a device-to-device session with a first user equipment;
    the at least one processing core being configured to, responsive to the first determination, include in the radio resource usage report radio resource usage information of the second user equipment, and
    a transmitter configured to cause the radio resource usage report to be transmitted from the first user equipment toward a network node,
    wherein the radio resource usage information comprises information on a registration used.

2. An apparatus according to claim 1, wherein the at least one processing core is further configured to include in the radio resource usage report information concerning resources used by the first user equipment.

3. An apparatus according to claim 1, wherein the radio resource usage report comprises information concerning at least one of the following: a bandwidth used, a time used and an amount of energy used in the device-to-device session.

4. An apparatus according to claim 2, wherein the information concerning resources used by the first user equipment comprises information on radio resources used for the device-to-device session.

5. An apparatus according to claim 1, wherein the information concerning the second user equipment comprises an identity of a network that the second user equipment is associated with.

6. An apparatus according to claim 1, wherein the device-to-device session comprises exchanging information encoded in radio waves directly between the first user equipment to the second user equipment, such that the radio waves are not retransmitted after being transmitted.

7. An apparatus according to claim 1, wherein the device-to-device session comprises exchanging information encoded in radio waves between the first user equipment and the second user equipment via a base station, such that the information is not forwarded from the base station to any core network node.

8. An apparatus according to claim 1, wherein the at least one processing core is configured to compile the radio resource usage report at least one of responsive to an event and periodically.

9. An apparatus according to claim 1, wherein the apparatus comprises or is comprised in the first user equipment.

10. An apparatus according to claim 1, wherein the apparatus comprises or is comprised in a base station.

11. A method, comprising:
    compiling a radio resource usage report comprising information concerning radio resources that have been used in a device-to-device session in a communication network;
    performing a first determination, that a second user equipment which is in an idle mode with respect to a cellular communication network is engaged in a device-to-device session with a first user equipment;
    including, responsive to the first determination, in the radio resource usage report radio resource usage information of the second user equipment, and
    causing the radio resource usage report to be transmitted from the first user equipment toward a network node,
    wherein the radio resource usage information comprises information on a registration used.

12. A method according to claim 11, further comprising including in the radio resource usage report information concerning resources used by the first user equipment.

13. A method according to claim 11, wherein the radio resource usage report comprises information concerning at least one of the following: a bandwidth used, a time used and an amount of energy used in the device-to-device session.

14. A method according to claim 12, wherein the information concerning resources used by the first user equipment comprises information on radio resources used for the device-to-device session.

15. A method according to claim 11, wherein the information concerning the second user equipment comprises an identity of a network that the second user equipment is associated with.

16. A method according to claim 11, wherein the device-to-device session comprises exchanging information encoded in radio waves directly between the first user equipment to the second user equipment, such that the radio waves are not retransmitted after being transmitted.

17. A method according to claim 11, wherein the device-to-device session comprises exchanging information encoded in radio waves between the first user equipment and the second user equipment via a base station, such that the information is not forwarded from the base station to any core network node.

18. A computer program product comprising a non-transitory computer-readable medium bearing computer program code embodied therein for use with a computer, the computer program code comprising:
    code for compiling a radio resource usage report comprising information concerning radio resources that have been used in a device-to-device session in a communication network;
    code for performing a first determination, that a second user equipment which is in an idle mode with respect to a cellular communication network is engaged in a device-to-device session with a first user equipment;

code for including, responsive to the first determination, in the radio resource usage report radio resource usage information of the second user equipment, and code for causing the radio resource usage report to be transmitted from the first user equipment toward a network node, wherein the radio resource usage information comprises information on a registration used.

* * * * *